No. 666,330. Patented Jan. 22, 1901.
O. B. SMITH.
TIRE SECURING DEVICE.
(Application filed Jan. 27, 1900.)
(No Model.)
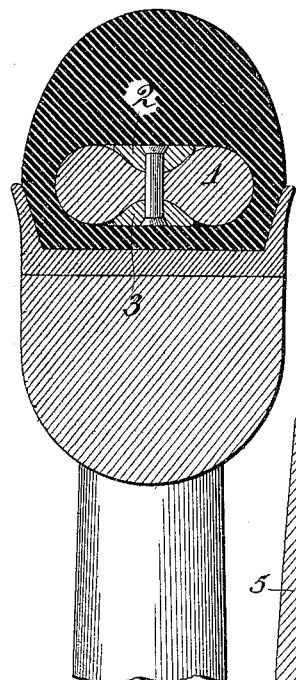
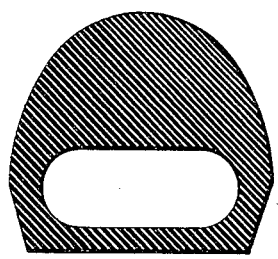
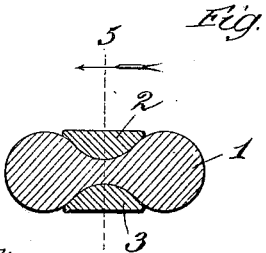
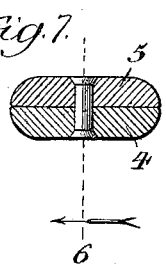
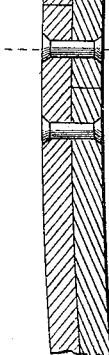
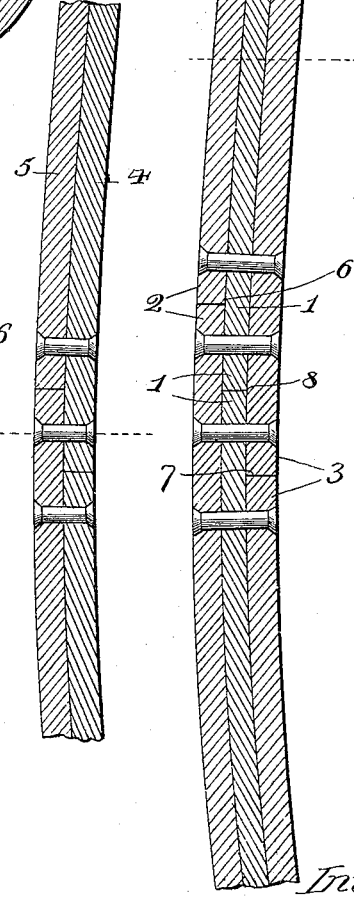
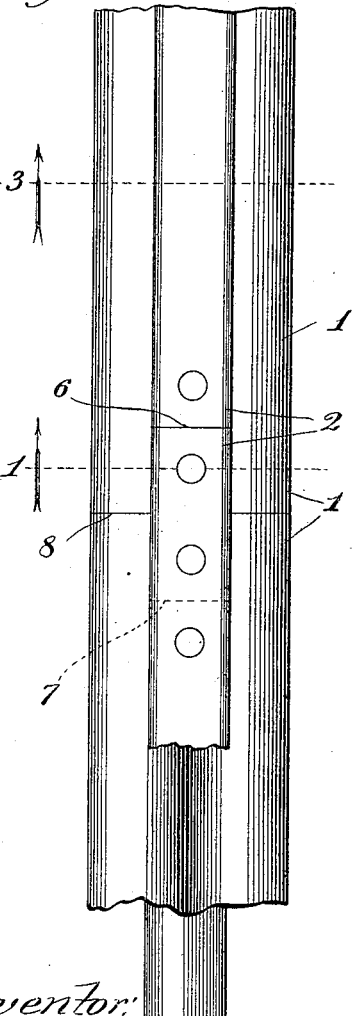
Witnesses:
Inventor:
Olin B. Smith
THE NORRIS PETERS CO., PHOTO-LITHO., WASHINGTON, D. C.

UNITED STATES PATENT OFFICE.

OLIN B. SMITH, OF CHICAGO, ILLINOIS.

TIRE-SECURING DEVICE.

SPECIFICATION forming part of Letters Patent No. 666,330, dated January 22, 1901.

Application filed January 27, 1900. Serial No. 3,063. (No model.)

*To all whom it may concern:*

Be it known that I, OLIN B. SMITH, a citizen of the United States, residing at 1277 Wilcox avenue, Chicago, in the county of Cook and State of Illinois, have invented a certain new and Improved Tire-Securing Device, of which the following, taken in connection with the accompanying drawings, is a specification.
My invention relates to the devices employed for holding rubber or other resilient tires in position on vehicle-wheels, and has for its object the provision of means whereby tires of the type specified will be more securely held than by devices heretofore employed, and whereby a more stable connection between the several parts of the securing device can be obtained, and whereby, further, the several parts of the securing device may be united in such a way as will not cause objectionable protrusions thereon and permit the tire ends to be brought together over the place of connection without any bulge or uneven place appearing upon the surface of the tire.

The above, as well as such other objects as may hereinafter appear, I obtain by means of the construction which I have illustrated in the preferred form in the accompanying drawings, in which—

Figure 1 is a section through the rim of a wheel having a tire applied thereto embodying my invention. Fig. 2 is a section through a tire before it is placed on the wheel. Fig. 3 is a section through a tire-securing device made in accordance with my invention. Fig. 4 is a partial plan view showing the point of connection of the several parts of the securing device. Fig. 5 is a sectional view on the line 5 5 of Fig. 3. Fig. 6 is a sectional view of a modified form of my invention, taken on the line 6 6 of Fig. 7, the latter showing a cross-sectional view of the tire-securing device embodying a modified form of my invention.

In carrying out my invention I provide a plurality of strands, preferably of metal, and arranged in contiguous relation to each other, with their meeting ends joined at different places. For example, in Figs. 1, 3, 4, and 5 I have shown a securing device formed of three strands 1, 2, and 3, of which the central one is preferably made larger than the others and of a shape similar to that shown in Fig. 3.

In Figs. 6 and 7 I have shown a securing device made of two strands only, 4 and 5, the said strands being approximately of the shape and arranged with reference to each other as shown in Fig. 7.

Where the ends of the several strands are to be united, I join the meeting ends at different places, as clearly shown in Figs. 4, 5, and 6. In Fig. 4, for example, the two meeting ends of the strand 2 are joined at 6, the two meeting ends of the strand 3 are joined at 7, and the two meeting ends of the intermediate strand 1 are joined at 8, and between each of the adjacent points of junction I arrange a rivet or other equivalent fastening device. The several meeting ends could be joined, if preferred, in a manner similar to that shown, but without the use of the rivets, solder, or other means being employed to hold the parts together.

While flat bands have heretofore been used for securing tires in place upon a rim, numerous difficulties have been encountered in securing them in place with sufficient tightness and with a sufficiently smooth joint. Not only must the joint at the ends of the band be of such a character as to offer no protuberance above the body of the band, but where a channel is employed, as shown, the joint must be such as can be made after the ends of the band have been tightly drawn together and within the limited space of the channel of the rim. Various attempts have been made to make a joint of this kind in connection with a single band by brazing, by electric welding, by riveting, and by union connections; but some difficulty has arisen in connection with each one. It is found in actual trial that these retaining-bands creep around within the rubber tire and that it is impossible to use devices for securing bands to the felly of the wheel for the reason that, owing to this creeping action of the band, there is liability to distortion of the tire itself.

It is clear from the above description of my invention that the difficulties enumerated are largely reduced and that by the use of a plurality of strands having their meeting ends joined as described the point of connection is, as it were, distributed over a larger space or length of strand in a manner somewhat akin to the way in which a rope is sometimes spliced when it is desired to secure a firm connection without materially increasing the diameter of the rope, my invention securing a similar advantage in that a firm joint is secured without any, or, at least, any material, increase in diameter or size of the retaining device, and thus permitting the meeting ends of the tire itself to be brought over the joint or joints without difficulty and without producing any protrusion or bulge on the outside of the tire.

It is obvious that tire-securing devices similar to mine could be made with the details variously modified without departing from the spirit of my invention, and I desire to be understood as including all such equivalent constructions as within the scope of my claims.

What I claim as new, and desire to secure by Letters Patent, is—

1. A tire-securing device comprising a plurality of strands having their meeting ends joined at different places, substantially as described.

2. A tire-securing device comprising a plurality of contiguous strands having their meeting ends joined at different places, substantially as described.

3. A tire-securing device comprising a plurality of strands having the juncture of the meeting ends of the several strands at different places, and rivets passing through on both sides of each point of junction, substantially as described.

4. A tire-securing device comprising an intermediate strand and two outside strands lying in close proximity to said intermediate strand, substantially as described.

5. A tire-securing device comprising an intermediate strand, outside strands lying contiguous thereto, the junction of the meeting ends of the said intermediate strand being at a place different from the place of junction of the meeting ends of the outside strands, substantially as described.

6. The combination of a wheel, a channeled rim therefor, a tire in said rim, and a securing device for said tire comprising a plurality of contiguous strands having their meeting ends joined at different places, substantially as described.

OLIN B. SMITH.

Witnesses:
PAUL SYNNESTVEDT,
PAUL CARPENTER.